UNITED STATES PATENT OFFICE.

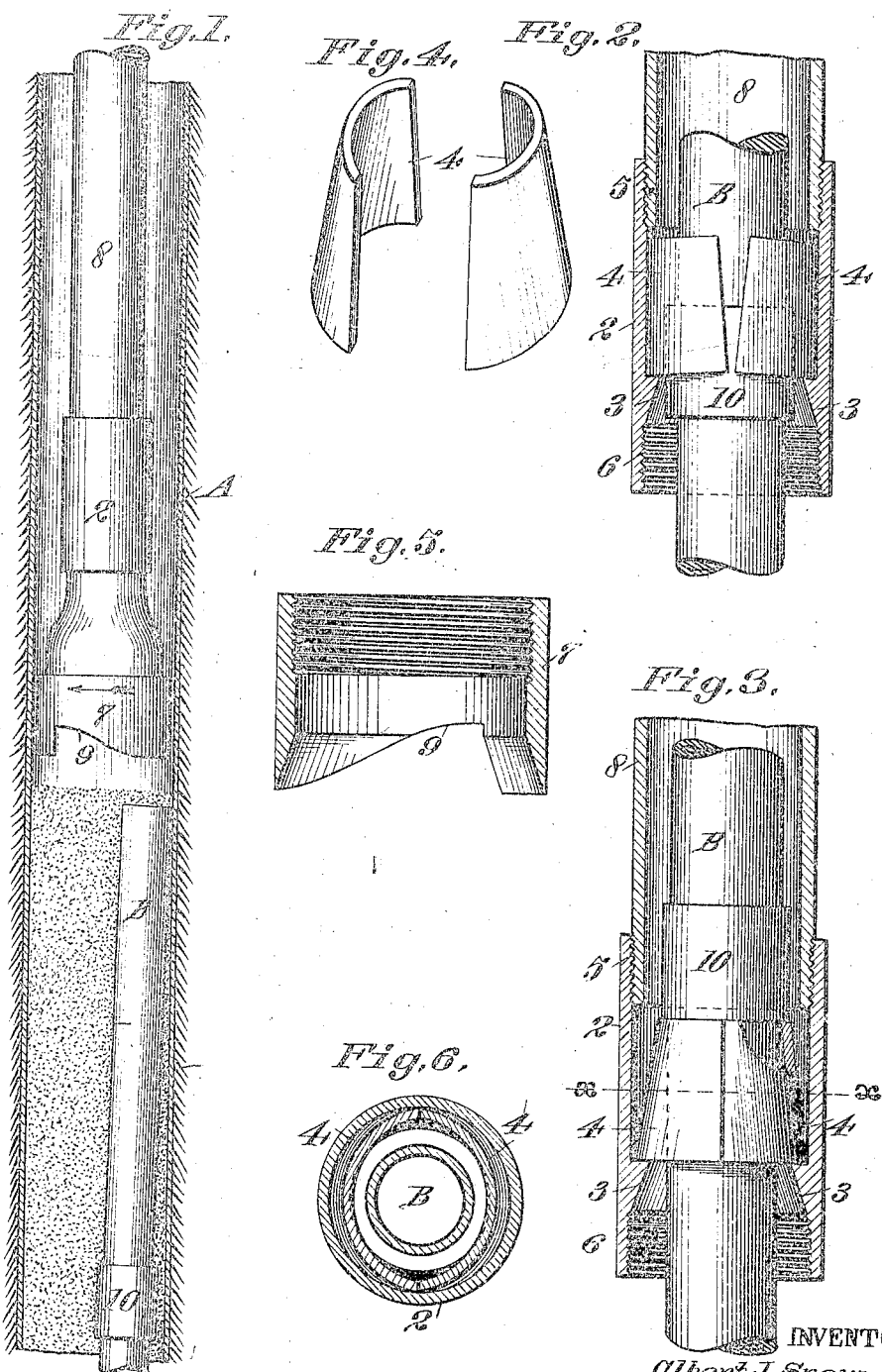

ALBERT J. SNOW, ARCHIE M. KIDD, AND JOHN H. WHALEY, OF TAFT, CALIFORNIA.

FISHING-TOOL.

1,103,545.  Specification of Letters Patent.  Patented July 14, 1914.

Application filed April 2, 1913. Serial No. 758,367.

*To all whom it may concern:*

Be it known that we, ALBERT J. SNOW, ARCHIE M. KIDD, and JOHN H. WHALEY, citizens of the United States, residing at Taft, in the county of Kern and State of California, have invented new and useful Improvements in Fishing-Tools, of which the following is a specification.

This invention relates to a fishing tool of the type used in well drilling operations.

The object of this invention is to provide a substantial, cheaply manufactured fishing tool, especially constructed to recover tools or sections of pipe which may have been lost in the well during drilling operations.

The invention consists of the parts and the construction and combination of parts as hereinafter more fully described and claimed, having reference to the accompanying drawings, in which—

Figure 1 is a section of a well showing the position of a lost pipe section and the position of the fishing tool just previous to engaging the lost pipe section. Fig. 2 is a central section of the fishing tool showing the spread position of the gripping jaws. Fig. 3 is a similar section showing the gripping position of the jaws with relation to the lost pipe section. Fig. 4 is a perspective view of the gripping jaws. Fig. 5 is a section of the guide shoe. Fig. 6 is a section on the line $x$—$x$ of Fig. 3.

Referring to the drawings: A indicates a well casing and B the upper portion of a tool or section of pipe which has been lost in the well, and which it is necessary to remove before further work on the well may be proceeded with.

The fishing tool here shown, which is especially constructed for the purpose of recovering tools or the like, consists of a sleeve member 2 in the center portion of which is formed an annular shoulder or seat portion 3, upon which is seated a pair of tapered segmental gripping jaws 4. The ends of the sleeve 2 are internally threaded, as at 5 and 6, for the purpose of permitting the attachment of the guide shoe 7 at the lower end, and also for the purpose of permitting the attachment of the sleeve to the pipe section indicated at 8 by which it is lowered into the well. The guide shoe may be made of any suitable shape, but should in all instances be of slightly less diameter than the interior of the well casing, and as here shown is preferably provided with a tapered or wedge-like edge, giving the guide shoe a chance to wedge itself between the well casing and the lost pipe section, as indicated at Fig. 1, thus permitting the fishing tool to pass over the pipe section B. It has also proven of advantage to notch the lower tapered edge of the shoe, as indicated at 9, particularly where it is possible to twist or revolve the pipe, the notch being provided for several purposes which will later be described.

By referring to Figs. 1, 2 and 3: Supposing that it is desired to recover the lost pipe section B, particularly shown in Fig. 1, the operation will be as follows: The fishing tool, comprising the sleeve 2, gripping jaws 4 and guide shoe 7, is suitably secured to the pipe section 8, as indicated at 5. This is then lowered into the well casing A, and other sections added as the tool is lowered. The moment the lost tool or section, indicated at B, is encountered it will be impossible to lower the fishing tool farther until the guide shoe 7 has been forced into a position where the lost section will pass through the gripping jaws 4 and into the lowered pipe section 8. This is most easily accomplished by turning the pipe section 8 with connected sleeve 2 and guide shoe 7 in the direction of arrow $a$. The wedge-like edge together with the notched portion 9 in revolving over the upper edge of the lost section B will soon find a point where the edge is permitted to wedge itself between the casing and the pipe section B, thus forcing this into position within the guide shoe 7, from where it is further directed into position between the gripping jaws 4 by revolving and lowering the pipe with connected attachments. The pipe 8 is thus forced or lowered downwardly with relation to the lost section B until the gripping jaws 4 have passed below any suitable projection on the pipe section or tool as the coupling 10. This is more particularly illustrated in Figs. 2 and 3. In Fig. 2 it will be seen that the moment the coupling section 10 enters between the gripping jaws 4, the separate sections of same will be forced outwardly against the walls of the sleeve 2 and permit the passage of the coupling. However, the moment the coupling has passed, as shown in Fig. 3, the separate sections of the gripping jaws immediately drop back against the pipe section and will then be in a position to engage the coupling and secure the lost section within the sleeve 2. It is then only necessary to raise the pipe 8 by any suitable apparatus not here shown until the lost pipe section B may be secured from above and removed in any suitable manner. By using a fishing tool constructed as here shown, it is also possible to remove lost sections which have become thoroughly embedded in sand or like material, which has entered the well and partly filled same. This is accomplished by revolving the pipe section 8 with connected tool and guide shoe in the direction or arrow a, and at the same time forcing water through the pipe section 8 under suitable pressure. The revolving movement of the pipe with connected guide shoe 9 will cause the tool to cut into the collected material within the well, and the loosened material will then be conveyed or carried off by the water under pressure discharging from the pipe 8, which is returned to the surface by passing between the pipe 8 and the inner wall of the well casing. From this it can be seen that it is possible to recover a lost pipe section 2 no matter how badly the lost section may be embedded in sands or like material. The notched formation of the lower edge of the guide shoe 9 also adds to the cutting efficiency of the tool, thus increasing its cutting efficiency.

The tapered segmental gripping jaws 4 are loosely mounted upon the annular shoulder, the lower base portion of same being sufficiently large to prevent their accidental removal through the lower end of the sleeve 2, while the upper end of the sleeve is partly closed by the entering pipe section 8, thus preventing their removal at this point. The tapered formation of the segmental sections is great enough to give the inner edges of the sections sufficient weight to always drop back into position with relation to each other, as shown in Fig. 3.

The tool here shown is simple and compact in construction and absolutely positive and reliable in action; the construction of same while permitting the passage of water through the tool will also attach itself and lock itself upon any form of tool which is provided with projections, shoulders, or the like, thus increasing its field of utility and efficiency.

The materials and finish of the several parts of the tool are such as experience and judgment of the manufacturer may dictate.

We wish it understood that various changes in form, proportions and minor details of construction may be resorted to within the scope of the appended claims, and that we do not wish to limit ourselves to the specific design and construction here shown.

Having thus described our invention, what we claim and desire to secure by Letters Patent is:

1. In a fishing tool for well boring apparatus, a sleeve having an interior seat adjacent its lower end and having a uniform internal diameter from said seat through the upper end of the sleeve, a pair of substantially semi-circular conically shaped jaws within said sleeve having their bases resting on said seat and having the outer faces of said bases loosely resting against the inner circumference of the sleeve, said jaws being capable of having movement in the sleeve both longitudinally and circumferentially thereof and to gravitate inwardly, and means to support the sleeve and to provide a closure for the upper end of the sleeve to thereby restrict outward movement of the jaws by engagement with the top ends of the latter consisting of a pipe threaded into the upper end of the sleeve.

2. In a fishing tool for well boring apparatus, a sleeve having an interior seat, a plurality of substantially semi-circular conically shaped jaws within said sleeve having their bases resting on said seat, and having the outer faces of said bases loosely resting against the inner circumference of the sleeve, said jaws being capable of having movement in the sleeve both longitudinally and circumferentially thereof and to gravitate inwardly, and means to close the upper end of the sleeve to restrict outward movement of the jaws by engagement with the top ends of the latter.

In testimony whereof we have hereunto set our hands in the presence of two subscribing witnesses.

ALBERT J. SNOW.
ARCHIE M. KIDD.
JOHN H. WHALEY.

Witnesses:
E. A. FLANDERS,
Dr. FRED P. BOLSTAD.